(12) United States Patent
Isobe

(10) Patent No.: US 11,162,883 B2
(45) Date of Patent: Nov. 2, 2021

(54) FLUID CHARACTERISTICS MEASUREMENT SYSTEM, PROGRAM STORAGE MEDIUM STORING PROGRAM FOR FLUID CHARACTERISTICS MEASUREMENT SYSTEM, AND FLUID CHARACTERISTICS MEASUREMENT METHOD

(71) Applicant: HORIBA STEC, Co., Ltd., Kyoto (JP)

(72) Inventor: Yasuhiro Isobe, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 192 days.

(21) Appl. No.: 15/840,798

(22) Filed: Dec. 13, 2017

(65) Prior Publication Data
US 2018/0164200 A1    Jun. 14, 2018

(30) Foreign Application Priority Data
Dec. 14, 2016    (JP) .............................. JP2016-242743

(51) Int. Cl.
*G01N 7/00*    (2006.01)
*G01F 25/00*    (2006.01)
(Continued)

(52) U.S. Cl.
CPC ................. *G01N 7/00* (2013.01); *G01F 1/56* (2013.01); *G01F 25/00* (2013.01); *G01N 1/10* (2013.01); *G01F 1/34* (2013.01); *G01F 1/76* (2013.01)

(58) Field of Classification Search
CPC ....................................................... G01N 7/00
(Continued)

(56) References Cited

U.S. PATENT DOCUMENTS 4,718,443 A * 1/1988 Adney ...................... G01F 3/36
137/486
5,218,840 A * 6/1993 Kolpak .............. G01N 33/2823
73/61.44
(Continued)

FOREIGN PATENT DOCUMENTS

JP        2006337346 A    12/2006
JP        2012032983 A     2/2012
(Continued)

OTHER PUBLICATIONS

Japan Patent Office, Decision to Grant a Patent Issued in Application No. 2016242743, dated Sep. 25, 2020, 5 pages.
(Continued)

*Primary Examiner* — John Fitzgerald
*Assistant Examiner* — Rodney T Frank
(74) *Attorney, Agent, or Firm* — Alleman Hall Creasman & Tuttle LLP

(57) ABSTRACT

The present invention makes it possible to easily obtain a compressibility factor that is a characteristic of a fluid, and thereby dramatically improves the accuracy of flow rate measurement by an ROR system or the like. The invention is adapted to include: a chamber having a constant volume; a flow rate controller connected to the chamber so as to make it possible to introduce or lead a fluid into or out of the chamber at a constant flow rate; and an information processor adapted to calculate a compressibility factor depending on the pressure of the fluid on the basis of time changes in pressure inside the chamber when the fluid is introduced into the chamber at the same flow rate as each other through the flow rate controller under two different pressure conditions inside the chamber.

4 Claims, 5 Drawing Sheets

(51) Int. Cl.
    *G01N 1/10*     (2006.01)
    *G01F 1/56*     (2006.01)
    *G01F 1/34*     (2006.01)
    *G01F 1/76*     (2006.01)

(58) Field of Classification Search
    USPC .............................................................. 73/37
    See application file for complete search history.

(56) References Cited

U.S. PATENT DOCUMENTS

| | | | |
|---|---|---|---|
| 7,174,263 B2 | 2/2007 | Shajii et al. | |
| 2006/0011237 A1* | 1/2006 | Tison | G01F 25/0038 137/487.5 |
| 2006/0123921 A1* | 6/2006 | Tison | G01F 7/005 73/861 |
| 2009/0183548 A1* | 7/2009 | Monkowski | G01F 25/0038 73/1.35 |

FOREIGN PATENT DOCUMENTS

| | | |
|---|---|---|
| JP | 2016080634 A | 5/2016 |
| TW | I444800 B | 7/2014 |
| TW | I470187 B | 1/2015 |

OTHER PUBLICATIONS

"Method for proving gas-tightness of vacuum plants," Indian Standards Institution, 10688-1983, Oct. 31, 1983, 11 pages.
Taiwan Intellectual Property Office, Office Action and Search Report Issued in Application No. 106143729, dated Mar. 4, 2021, 10 pages.

* cited by examiner

| GAS TYPE | TEMPERATURE (°C) | VIRIAL COEFFICIENT |
|---|---|---|
| AA | 15 | 10.3 |
| AA | 20 | 10.5 |
| AA | 25 | 10.8 |
| BB | 15 | 8.2 |
| BB | 20 | 8.8 |
| BB | 25 | 9.6 |
| CC | 15 | −2 |
| CC | 20 | −2.5 |
| ⋮ | ⋮ | ⋮ |

FIG. 4

FLUID CHARACTERISTICS MEASUREMENT SYSTEM, PROGRAM STORAGE MEDIUM STORING PROGRAM FOR FLUID CHARACTERISTICS MEASUREMENT SYSTEM, AND FLUID CHARACTERISTICS MEASUREMENT METHOD

TECHNICAL FIELD

The present invention relates to a fluid characteristics measurement method and the like adapted to measure a compressibility factor that is one of the characteristics of fluid used for, for example, a semiconductor manufacturing process.

BACKGROUND ART

A rate-of-rise (ROR) system is a system adapted to measure the rise rate of pressure in reference volume when a measurement fluid is flowed, and measure the mass flow rate of the measurement fluid on the basis of a gas state equation, and various flow rate measurement devices can be verified using the ROR system.

In order to obtain an accurate mass flow rate in the ROR system, a compressibility factor that is a factor indicating a deviation from the state equation of the measurement fluid is required.

In the case of an ideal fluid, the compressibility factor is 1; however, in the case of a real flow, the compressibility factor of course depends on the type of the real flow, and changes depending on pressure even in the case of the same type of a fluid.

Therefore, as disclosed in Patent Literature 1, a conventional ROR system is adapted to obtain a mass flow rate using a pressure-dependent compressibility factor described in literatures.

However, the compressibility factors of all fluids are not obtained in advance, and only a compressibility factor at a certain pressure may be known as a representative value.

In the case of a fluid whose compressibility factor is unknown or representative value is only known, there exists a problem of difficulty of highly accurate measurement.

CITATION LIST

Patent Literature

Patent Literature 1: Japanese Unexamined Patent Publication JP-A 2006-337346

SUMMARY OF INVENTION

Technical Problem

The present invention is made in consideration of such a problem, and intends to make it possible to easily obtain a pressure-dependent compressibility factor of a fluid, and thereby dramatically improve the accuracy of flow rate measurement by an ROR system or the like.

Solution to Problem

That is, a fluid characteristics measurement system according to the present invention includes: a chamber having a constant volume; a flow rate controller connected to the chamber so as to make it possible to introduce or lead a fluid into or out of the chamber at a constant flow rate; and an information processor adapted to calculate a compressibility factor depending on the pressure of the fluid on the basis of time changes in pressure inside the chamber when the fluid is introduced into or led out of the chamber at the same flow rate as each other through the flow rate controller under two different pressure conditions inside the chamber.

More specifically, it is preferable that the information processor has a function of, on the assumption that the compressibility factor has a constant value independent of pressure, temporarily calculating flow rates under the respective conditions from the time change in the pressure and the volume of the chamber, and on the basis of temporary flow rates that are the temporarily calculated flow rates, calculating the compressibility factor.

In order to make it possible to accurately measure the flow rate of the fluid as well simultaneously with measuring the compressibility factor, it is preferable that the information processor is one adapted to obtain the relationship between pressure and a temporary flow rate from pressures and the temporary flow rates under the respective conditions, calculate a temporary flow rate from the relationship when the pressure inside the chamber is 0, set the temporary flow rate at the pressure of 0 as a true flow rate, and on the basis of the true flow rate and a time change in pressure when the pressure inside the chamber has a predetermined value, calculate the compressibility factor.

Advantageous Effects of Invention

According to the present invention configured as described above, since a pressure-dependent compressibility factor of a gas whose flow rate is to be measured can be calculated/measured, when an ROR system or the like measures a flow rate, it is possible to accurately compensate for an error of a measured flow rate occurring due to the compressibility factor.

BRIEF DESCRIPTION OF DRAWINGS

FIG. 4 illustrates a virial coefficient stored together with temperature and a gas type.

DESCRIPTION OF EMBODIMENTS

A flow rate measurement system 100 according to one embodiment of the present invention will be described with reference to the drawings.

The flow rate measurement system 100 is a kind of so-called ROR system used as a standard instrument for measuring the flow rate of, for example, a gas (a compressible fluid), and has a function capable of measuring a compressibility factor as well, which is one of the characteristics of the gas. In that sense, the flow rate measurement system 100 is also a fluid characteristics measurement system.

Figure 1:
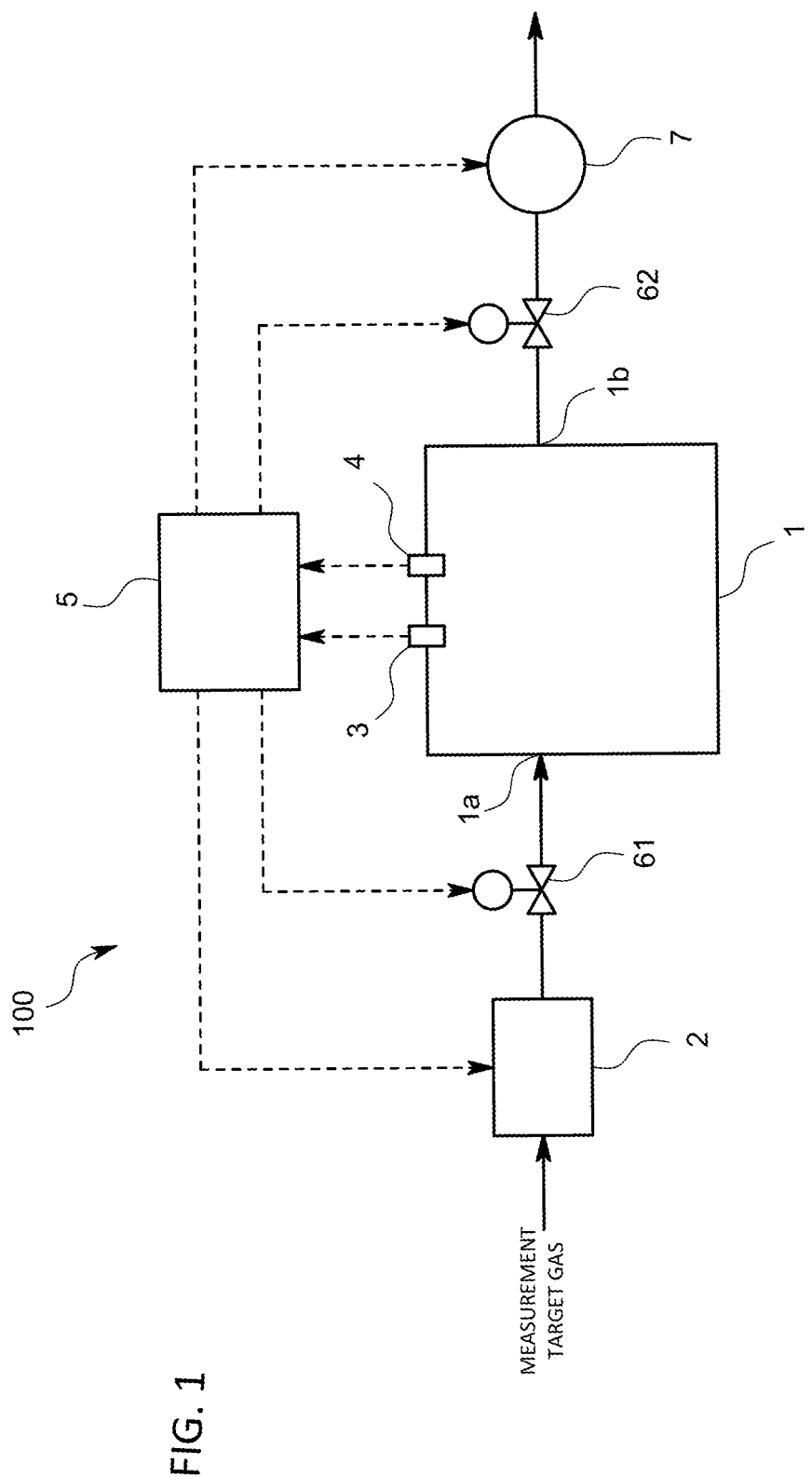
FIG. 1 is a schematic diagram illustrating the whole of a flow rate measurement system according to one embodiment of the present invention.

As illustrated in FIG. 1, the flow rate measurement system 100 includes: a chamber 1 having a constant volume; a flow rate controller 2 making it possible to introduce a gas into the chamber 1 at a constant flow rate; a pressure sensor 3 for measuring the pressure inside the chamber 1; a temperature sensor 4 for measuring the temperature inside the chamber 1; an information processor 5 for calculating the flow rate and compressibility factor of the gas; and the like.

The chamber 1 is a metallic chamber capable of being evacuated. The chamber 1 is provided with a gas introduction port 1a and a gas lead-out port 1b. The introduction port 1a is connected with the flow rate controller 2 via a first on-off valve 61, and the lead-out port 1b is connected with a suction pump 7 via a second on-off valve 62. Also, the chamber 1 is attached with an unillustrated temperature control mechanism, and thereby the temperature inside the chamber 1 is kept constant. The temperature is measured by the temperature sensor 4.

The flow rate controller 2 is one making it possible to flow the gas at a constant mass flow rate, and as an example, a feedback type mass flow controller capable of controlling a mass flow rate to be constant can be cited. Alternatively, the flow rate controller 2 may be a critical orifice type constant flow rate instrument or the like. In this embodiment, a specified standard instrument often used in an ROR system is used.

Figure 2:
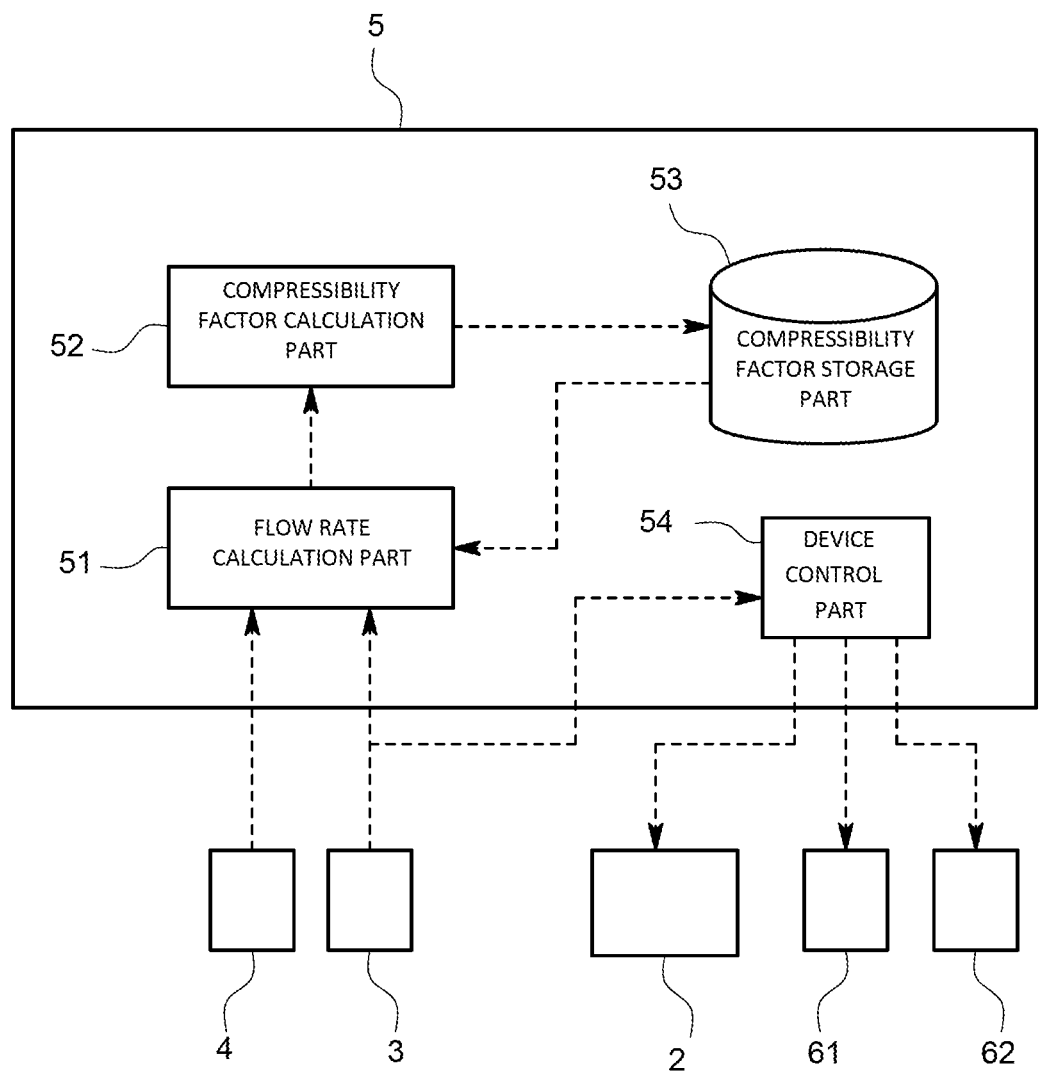
FIG. 2 is a functional block diagram illustrating a control device in the same embodiment.

The information processor 5 is an electronic circuit including a CPU, a memory, A/D and D/A converters, input/output means, drivers, and the like. In addition, the CPU and its peripheral devices cooperate on the basis of a program stored in the memory, and thereby as illustrated in FIG. 2, the information processor 5 fulfills functions as a flow rate calculation part 51, a compressibility factor calculation part 52, a compressibility factor storage part 53, a device control part 54, and the like.

Next, the respective part will be described in detail while describing the operation of the flow rate measurement system 100.

First, an operator inputs the type of the gas as a flow rate measurement target to the information processor 5 using unillustrated input means and/or communication means, and then starts the measurement. The input allows the type of the gas to be stored in a predetermined area of the memory.

After the start, the device control part 54 opens the second on-off valve 62 with the first on-off valve 61 closed, and operates the suction pump 7. In doing so, the pressure inside the chamber 1 falls.

The device control part 54 is monitoring measured pressure data from the pressure sensor 3, and when the pressure inside the chamber 1 reaches 0, i.e., when the chamber 1 is evacuated, closes the second on-off valve 62 and then stops the suction pump 7.

Subsequently, the device control part 54 operates the flow rate controller 2 as well as opening the first on-off valve 61. In doing so, the fluid whose flow rate is controlled to a constant mass flow rate (note that the value of the flow rate is unknown) flows into the chamber 1 and the pressure inside the chamber rises.

In this state, the flow rate calculation part 51 temporarily calculates the flow rate $Q_{tmp}$ of the gas flowing through the flow rate controller 2 on the basis of the state equation of the gas with a compressibility factor set to be constant. The temporarily calculated flow rate is hereinafter referred to as a temporary flow rate $Q_{tmp}$.

A procedure for the calculation is as follows.

The state equation of the gas is expressed by the following expression (Expression 1).

$$PV = nZRT \quad \text{[Expression 1]}$$

Here, P represents the pressure inside the chamber 1, V the volume of the chamber 1, n the amount of substance (the mass of the gas), R the gas constant, and T the temperature inside the chamber 1.

Also, Z represents the compressibility factor of the gas, and is set to a constant value independent of pressure, more specifically set to 1 (Z=1) on the assumption that the gas is an ideal gas.

Temporally differentiating the above expression (Expression 1) gives:

$$Q_{tmp} = \frac{dn}{dt} = \left(\frac{V}{ZRT}\right)\frac{dp}{dt} \quad \text{[Equation 2]}$$

In Expression 2, V and R are known and the values of them are preliminarily stored in the memory. Also, T has a constant value obtained by the temperature sensor 4, and Z is 1.

Accordingly, the flow rate calculation part 51 substitutes, in addition to these values, a time change in measured pressure dP/dt by the pressure sensor 3 into Expression 2, or performs calculation equivalent to Expression 2 to thereby calculate the temporary flow rate $Q_{tmp}$.

In addition, the time change in measured pressure is calculated from a change in pressure sampled and measured at very short time intervals.

When plotting the temporary flow rate $Q_{tmp}$ with respect to the pressure, it changes depending on the pressure. This is because the compressibility factor of the gas is not actually constant but changes depending on the pressure.

Figure 3:
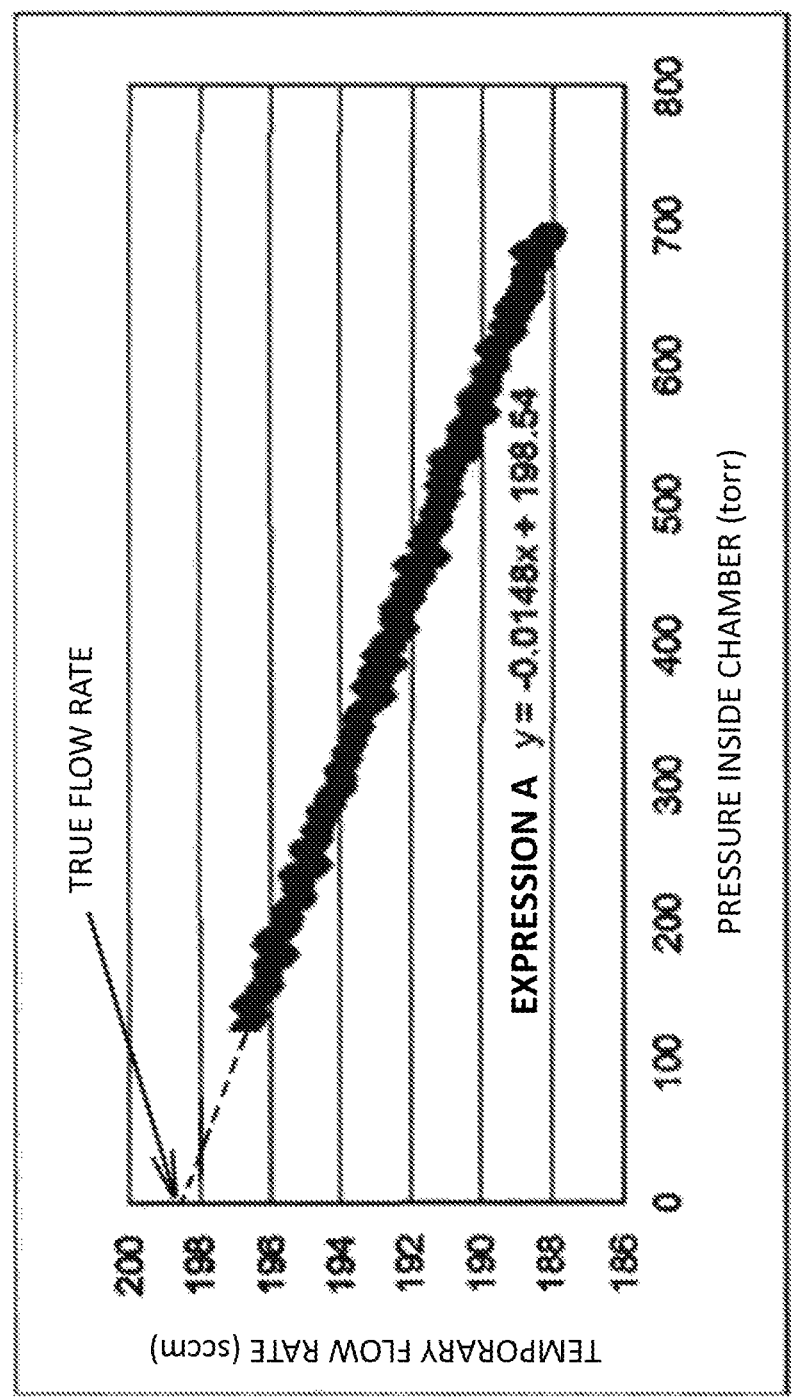
FIG. 3 is a diagram illustrating the relationship between the temporary flow rate and pressure when the gas is C4F8.

More specifically, in most gases, the temporary flow rate $Q_{tmp}$ has a linear relationship with pressure at a certain pressure or less (e.g., 760 Torr or less). For example, when the gas is C4F8, the relationship is as illustrated in FIG. 3. This was first found by the present inventor.

In order to utilize this, in this embodiment, the flow rate calculation part 51 obtains temporary flow rates under two arbitrarily determined or predetermined different pressure conditions.

Also, when the flow rate is constant, pressure and the temporary flow rate have the linear relationship as described above, and therefore the flow rate calculation part 51 obtains a relational expression between pressure and the temporary flow rate (a linear expression, Expression A in FIG. 3) from the temporary flow rates under the two different pressure conditions.

Then, the flow rate calculation part 51 calculates a temporary flow rate at a pressure of 0 from the relational expression.

At a pressure of 0, all gases have a compressibility factor of 1 as with an ideal gas, and therefore the temporary flow rate $Q_{tmp}$ (198.54 sccm in FIG. 3) at a pressure of 0 calculated by the flow rate calculation part 51 is the same as an actual flow rate Q.

Accordingly, the flow rate calculation part 51 stores the temporary flow rate $Q_{temp}$ at a pressure of 0 in a predetermined area of the memory as a true flow rate Q.

After the flow rate calculation part 51 has calculated the flow rate Q of the gas as described above, the compressibility factor calculation part 52 calculates the compressibility factor of the gas in the following procedure.

The state equation of the gas is as given by the above-described expression (Expression 1).

Also, since the compressibility factor Z varies depending on pressure and temperature, the virial expansion gives the compressibility factor Z as the following expression.

$$Z = 1 + BP + CP^2 + \ldots \quad \text{[Expression 3]}$$

Here, B, C, ... are virial coefficients, which are functions of temperature, but in this case, constants because temperature is constant.

At a pressure P of 0, Z=1, and as pressure increases, the contribution of higher-order "P" terms increases; however, as described above, relatively low pressure is of interest to the present invention, and therefore second order and higher terms can be neglected. Accordingly, the compressibility factor Z can be expressed as follows.

$$Z = 1 + BP \quad \text{[Expression 4]}$$

Substituting Expression 4 into Expression 1 and temporally differentiating the resulting expression give the flow rate Q as follows.

$$\begin{aligned} Q &= \frac{dn}{dt} \quad \text{[Expression 5]} \\ &= \frac{d}{dt}\left(\frac{PV}{ZRT}\right) \\ &= \left(\frac{V}{RT}\right)\left(\frac{dP}{dt}\frac{1}{Z} + P\frac{d}{dz}\left(\frac{1}{Z}\right)\frac{dZ}{dP}\frac{dP}{dt}\right) \\ &= \left(\frac{V}{RT}\right)\frac{dP}{dt}\left(\frac{1}{Z} - BP\frac{1}{Z^2}\right) \\ &= \left(\frac{V}{RT}\right)P'\left(\frac{1}{Z^2}\right) \end{aligned}$$

where, $P' = \dfrac{dP}{dt}$

In addition, by expanding $(1/Z^2)$ using the binomial theorem and neglecting the second-order or higher terms of the resulting expression, $(1/Z^2)$ can be expressed as $1/Z^2 = 1 - 2Z$, and therefore Expression 5 can be further expressed as follows.

$$Q = \left(\frac{V}{RT}\right)P'(1 - 2BP) \quad \text{[Expression 6]}$$

Deforming Expression 6 gives the following expression.

$$B = \frac{1}{2P}\left(1 - Q\frac{RT}{V}\frac{1}{P'}\right) \quad \text{[Expression 7]}$$

The compressibility factor calculation part 52 uses Expression 7 or performs calculation equivalent to Expression 7 to obtain the virial coefficient B, and calculates the pressure-dependent compressibility factor Z expressed by Expression 4.

More specifically, V, R, and T are known, and Q is calculated by the flow rate calculation part 51. Accordingly, the compressibility factor calculation part 52 obtains measured pressure $P_t (\neq 0)$ at a certain time point from the pressure sensor 3 as well as calculates a pressure rise rate $P_t'$ at the time point, and thereby calculates the virial coefficient B. Then, by substituting the virial coefficient B into Expression 4, the compressibility factor Z as a function of pressure is obtained.

Note that when calculating the virial coefficient, the compressibility factor calculation part 52 must obtain measured pressure $P_t$ at a certain time point and a pressure rise rate $P_t'$ at the time point as described above. However, it is only necessary to use pressure and a pressure rise rate under any of the two conditions, which were measured when the flow rate calculation part 51 calculated the temporary flow rate, and therefore pressure remeasurement at the time of the compressibility factor calculation is not necessary.

The virial coefficient B and/or the compressibility factor Z calculated by the compressibility factor calculation part 52 as described above is stored in the compressibility factor storage part 53 together with temperature and a gas type used for the calculation as a set as illustrated in FIG. 4.

After this, when measuring the flow rate of the same type of gas, the flow rate calculation part 51 calculates the flow rate by substituting a compressibility factor or a virial coefficient stored in the compressibility factor storage part 53 into Expression 6 or performing calculation equivalent to Expression 6 on condition that temperature is kept the same.

Since such a configuration makes it possible to accurately calculate the compressibility factor of a gas whose flow rate is to be measured, it is possible to compensate for an error of a measured flow rate occurring due to a compressibility factor when an ROR system like the flow rate measurement system 100 measures a flow rate.

Also, even in the case of a gas whose compressibility factor is unknown, at the time of first flow rate measurement by the flow rate measurement system 100, a compressibility factor is calculated/measured by software in parallel with the flow rate measurement. As a result, special equipment for calculating the compressibility factor is unnecessary, and considerable time and effort for it is also unnecessary.

Note that the present invention is not limited to the above-described embodiment.

For example, in the case of a gas whose compressibility factor at a predetermined pressure (and temperature) is known, a flow rate measurement part measures a pressure rise rate at the predetermined pressure. Then, a temporary flow rate $Q_{tmp}$ obtained by substituting the value of the pressure rise rate into Expression 2 is set as a true flow rate Q. A subsequent procedure for obtaining a compressibility factor is the same as above.

In this case, as long as the pressure rise rate at the predetermined pressure is measured at the time of flow rate measurement, the compressibility factor can be obtained without measuring pressure rise rates at two pressures.

Also, the above-described embodiment is adapted to keep introducing the gas into the chamber 1 at the constant flow rate; however, it is only necessary that only under the two different pressure conditions inside the chamber 1 (for measuring a time change in pressure), the introduction flow rates of the gas are the same, and flow rates at other timings may differ from each other.

In addition, since the device control part 54 starts to flow the fluid into the container 1 when the container 1 is evacuated (when the pressure inside the container reaches very low pressure), immediately after the fluid starts to flow into the container 1, the temporary flow rate $Q_{tmp}$ is unstable, and the linear relationship between the temporary flow rate $Q_{tmp}$ and pressure may not be kept. Even in such a case, the relational expression between the temporary flow rate $Q_{tmp}$ and pressure (a linear expression) can be obtained on the basis of the relationship between temporary flow rates $Q_{temp}$ and pressures measured at timings when the introduction flow rates of the gas into the container 1 become the same under the two different pressure conditions inside the container 1.

Figure 5:
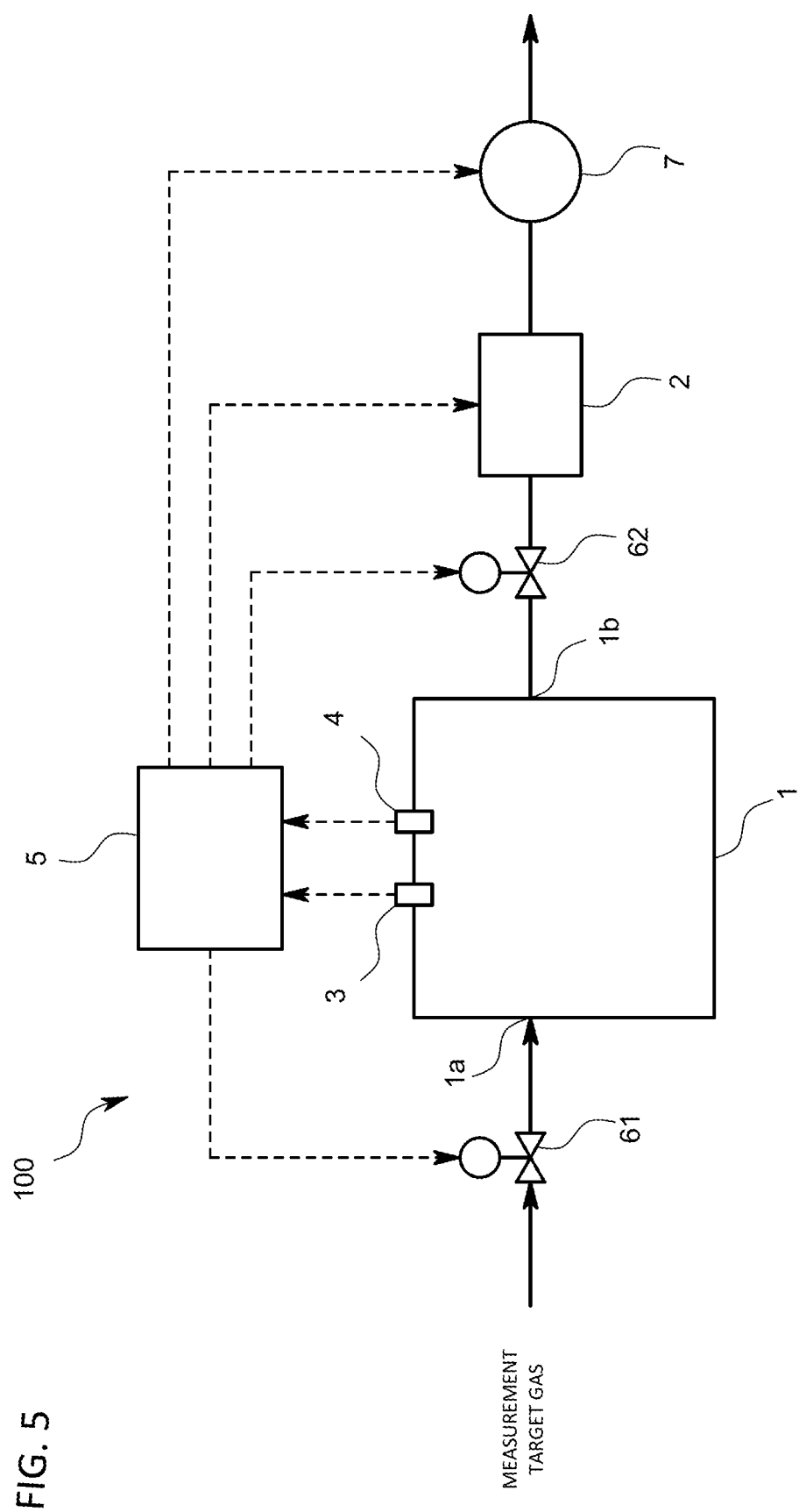
FIG. 5 is a schematic diagram illustrating the whole of a flow rate measurement system according to another embodiment of the present invention.

Further, as illustrated in FIG. 5, a compressibility factor depending on the pressure of a gas may be calculated on the basis of a time change in pressure inside the chamber observed when the flow rate controller 2 is connected to the lead-out port 1b of the chamber 1 and the gas is led out of the chamber 1 at a constant flow rate.

Besides, the present invention may combine various variations and the embodiment without departing from the scope thereof.

LIST OF REFERENCE CHARACTERS

100: Flow rate measurement system (fluid characteristics measurement system)
1: Chamber
2: Flow rate controller
5: Information processor

The invention claimed is:

1. A fluid characteristics measurement system comprising:
a chamber having a constant volume;
a flow rate controller connected to the chamber so as to make it possible to introduce or lead a fluid into or out of the chamber at a constant flow rate; and
an information processor configured to calculate a compressibility factor depending on a temperature inside the chamber and a change in pressure of the fluid inside the chamber over a change in time when the fluid is introduced into or led out of the chamber at a same flow rate as each other through the flow rate controller under two different pressure conditions inside the chamber, wherein
the information processor is configured to:
calculate temporary flow rates under the respective pressure conditions from the change in the pressure over the change in time and the volume of the chamber,
on a basis of the calculated temporary flow rates and the respective pressure values that correspond to the different pressure conditions, calculate a relational expression between the pressure and the temporary flow rates, the relational expression having a linear relationship between pressure and flow rate,
on a basis of the relational expression having the linear relationship, calculate a true flow rate; and
on a basis of true flow rate, the temperature inside the chamber, and the change in pressure of the fluid inside the chamber over the change in time, calculate the compressibility factor that is dependent on the pressure of the fluid.

2. The fluid characteristics measurement system according to claim 1, wherein
the information processor is one configured to:
on the basis of the linear relationship and the change in pressure over the change in time when the pressure inside the chamber has a predetermined value, calculate the compressibility factor.

3. A non-transitory program storage medium storing a program for a fluid characteristics measurement system, the program being loaded in the fluid characteristics measurement system comprising a chamber having a constant volume, a flow rate controller connected to the chamber so as to make it possible to introduce or lead a fluid into or out of the chamber at a constant flow rate, and an information processor, wherein
the program instructs the information processor to fulfill a function of calculating a compressibility factor depending on a temperature inside the chamber and a change in pressure of the fluid inside the chamber over a change in time when the fluid is introduced into or led out of the chamber at a same flow rate as each other through the flow rate controller under two different pressure conditions inside the chamber, and
the information processor is configured to:
calculate temporary flow rates under the respective pressure conditions from the change in the pressure over the change in time and the volume of the chamber,
on a basis of the calculated temporary flow rates and the respective pressure values that correspond to the different pressure conditions, calculate a relational expression between the pressure and the temporary flow rates, the relational expression having a linear relationship between pressure and flow rate, and
on a basis of the relational expression having the linear relationship, calculate a true flow rate; and
on a basis of true flow rate, the temperature inside the chamber, and the change in pressure of the fluid inside the chamber over the change in time, calculate the compressibility factor that is dependent on the pressure of the fluid.

4. A fluid characteristics measurement method for calculating a compressibility factor of a fluid in a chamber having a constant volume, the compressibility factor depending on a temperature inside the chamber and a change in pressure of the fluid inside the chamber over a change in time when the fluid is introduced into or led out of the chamber at a same flow rate as each other under two different pressure conditions inside the chamber, the method comprising:
calculating temporary flow rates under the respective pressure conditions from the change in the pressure over the change in time and the volume of the chamber;
on a basis of the calculated temporary flow rates and the respective pressure values that correspond to the different pressure conditions, calculating a relational expression between the pressure and the temporary flow rates, the relational expression having a linear relationship between pressure and flow rate; and
on a basis of the relational expression having the linear relationship, calculating a true flow rate; and
on a basis of true flow rate, the temperature inside the chamber, and the change in pressure of the fluid inside the chamber over the change in time, calculating the compressibility factor that is dependent on the pressure of the fluid.

\* \* \* \* \*